April 30, 1940.  J. W. BELL  2,199,065
DISPENSING AND MEASURING MACHINE
Filed April 20, 1938   3 Sheets-Sheet 2

INVENTOR
JOHN W. BELL
BY
ATTORNEYS

April 30, 1940.   J. W. BELL   2,199,065
DISPENSING AND MEASURING MACHINE
Filed April 20, 1938    3 Sheets—Sheet 3

Inventor.
John W. Bell
By
Attorneys.

Patented Apr. 30, 1940

2,199,065

UNITED STATES PATENT OFFICE 2,199,065

DISPENSING AND MEASURING MACHINE

John W. Bell, Chicago, Ill., assignor, by mesne assignments, to E. H. Sieling, Chicago, Ill.

Application April 20, 1938, Serial No. 203,093

15 Claims. (Cl. 221—108)

This invention appertains to machines for dispensing a measured quantity of granular or pulverized material, such as medicines, malted milk, coffee, and the like, and more particularly to a machine of this character for dispensing products affected by humidity and temperature, such as "Ovaltine."

It is highly desirable to produce a machine for soda fountains, and the like, for dispensing "Ovaltine." However, "Ovaltine" is a substance which is particularly affected by moisture, and has a tendency to become sticky and actually turn into a molasses like fluid when subjected to humidity and warm temperature. Thus, ordinary dispensing machines cannot handle "Ovaltine," and this is particularly true in the Southern States, or in a tropical or semi-tropical climate.

It is therefore one of the primary objects of my invention to provide a dispensing machine, in which the material therein is fully protected from the atmosphere, whereby the material will not be affected by moisture, and the like, to the end that the substance, such as "Ovaltine," can be expeditiously and automatically dispensed upon the actuation of a suitable operating lever, or other mechanism.

Another salient object of my invention is the provision of novel means for sealing the jar or hopper containing the material to be dispensed so that the entrance of moisture into the jar will be precluded.

A further important object of my invention is the provision of novel means for producing a sealing contact between the rotor of the dispensing machine, and the base of the dispensing machine, so that the creeping in of air between the rotor and base and into the jar or hopper will be eliminated.

A further object of my invention is the provision of a valve-like disc for normally closing the measuring opening or compartment in the rotor, when said opening is in its discharging position, means being provided for automatically actuating said valve-like disc when the measuring compartment is moved from out of registration with the discharging opening, to permit the re-filling of the measuring compartment from the hopper or jar.

A further object of my invention is the provision of novel means for supporting and mounting said disc, whereby the same will have a floating contact with the rotor to insure the proper sealing contact therewith.

A further object of my invention is the provision of novel means for forming the base, whereby a portion of the contents of the hopper or jar will be supported thereby against movement under influence of the rotor, so as to insure the proper loading of the measuring compartment upon actuation of the rotor.

A further object of my invention is the provision of a novel agitator member carried by the rotor for movement over the material supporting portion of the base, whereby to prevent contacting of the material on said supporting portion of the base.

A further object of my invention is the provision of a removable discharge spout and plate, so that the plate and spout can be removed to facilitate the cleaning of the base, the spout and plate being held in position in a novel manner, whereby the same will have a frictional floating contact with the rotor, to prevent the creeping in of air between the plate and the rotor, the arrangement being such that the quick removal and placing of the plate in position is insured.

A still further object of my invention is to provide an improved dispensing and measuring machine of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:

Figure 1:
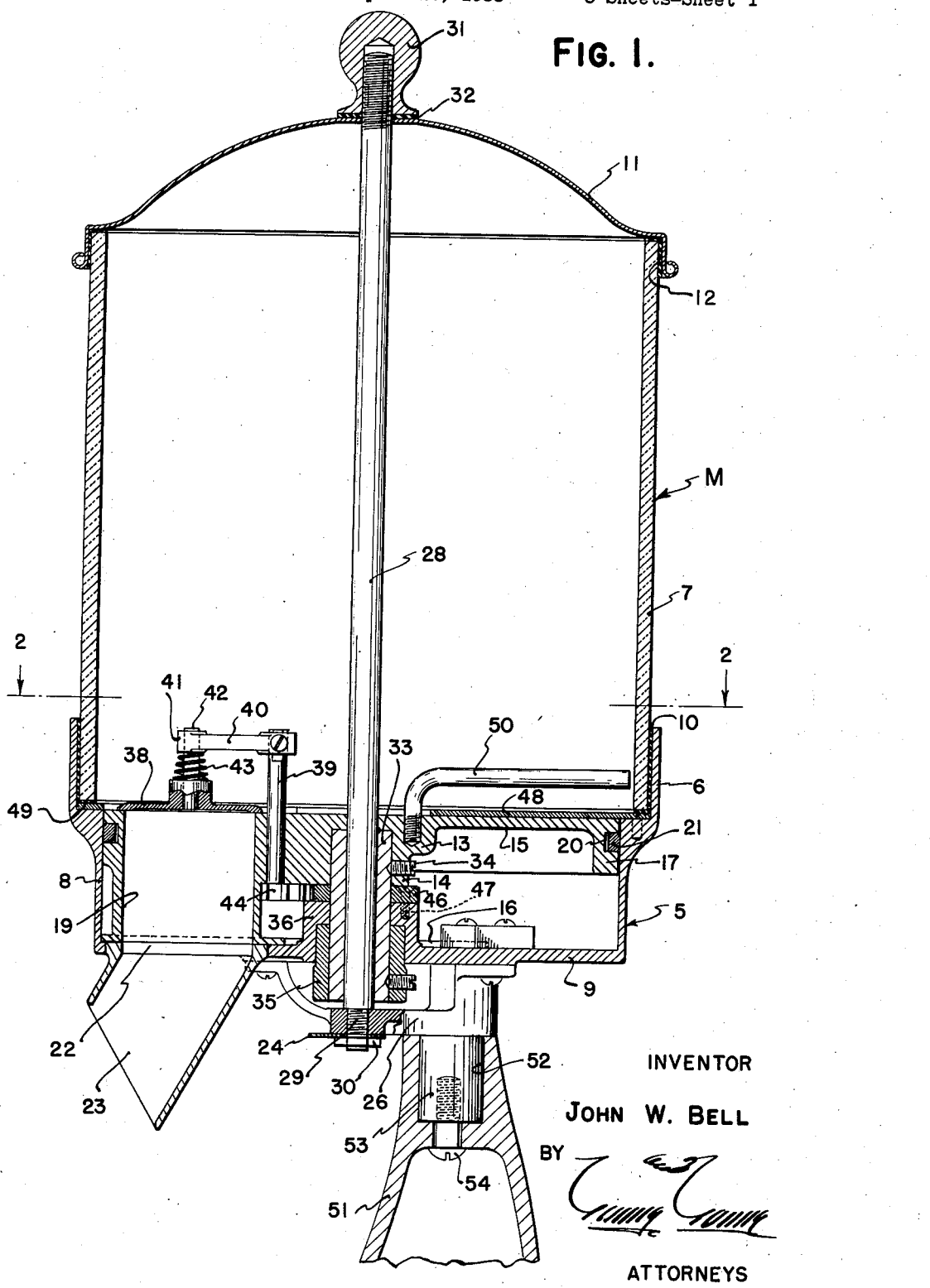
Figure 1 is a central vertical section through my improved dispensing machine, taken substantially on line 1—1 of Figure 2, looking in the direction of the arrows.

Referring to the drawings in detail, wherein similar reference characters designate corresponding parts throughout the several views, the letter M generally indicates my improved dispensing machine, which comprises a base 5 having an annular upstanding flange 6 for receiving the jar or hopper 7 for the material to be dispensed. The hopper 7 is preferably formed from transparent material, such as glass, so that the contents of the hopper can be readily seen by the casual observer.

The base 5 is of a hollow construction, and thus includes the circumferentially extending side wall 8, and a bottom wall 9. The flange 6 is slightly offset from the main portion of the base to form an internal shoulder against which the bottom of the hopper is adapted to seat. The lower end of the hopper can be provided with a sealing gasket 10 to prevent creeping in of moisture between the base and the jaw. A removable cover 11 is provided for the jar or hopper the cover and the hopper. The cover is detachably held on the jar or hopper in a novel manner, which will be later described, so as to effectively prevent the seeping of moisture into the hopper, and this means also functions to hold the hopper on the base.

Rotatably mounted within the base 5 is the rotor 13. This rotor 13 is also preferably of a hollow construction, and thus the same includes a hub 14, a top plate 15, and a bottom plate 16. The top plate 15 is of a disc-like construction having a depending rim 17. The bottom plate 16 forms only a segment of a disc, and can be connected with the rim 17 by webs 18. The bottom wall 16 rests upon the upper surface of the bottom wall 9 of the base, and travels thereover during the rotation of the rotor.

Formed in the rotor is a measuring chamber 19, and by referring to Figure 1 it can be seen that this chamber has no top or bottom, and hence the material introduced therein normally rests upon the bottom wall 9 of the base.

Figure 3:
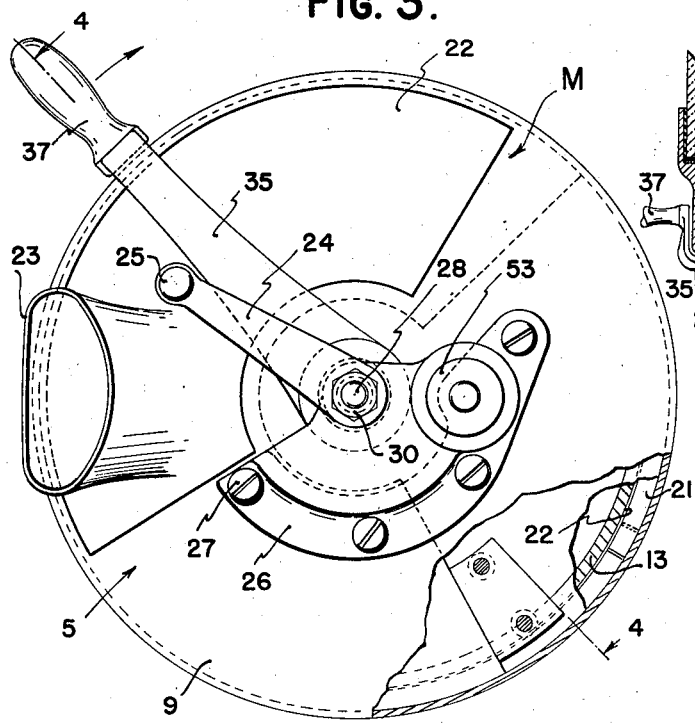
Figure 3 is a bottom plan view of the dispensing machine, with the supporting base and column removed, parts of the machine being shown broken away and in section.
Figure 4:
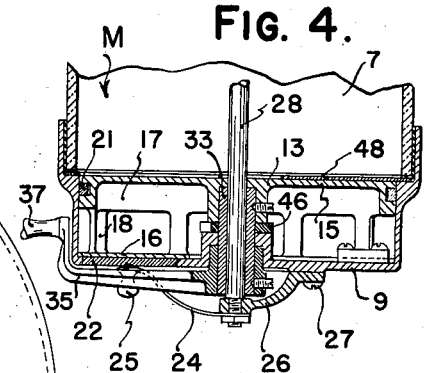
Figure 4 is a detail, fragmentary vertical section taken on the line 4—4 of Figure 3, looking in the direction of the arrows, Figure 4 being shown on a smaller scale than the other views.

In order to form an effective air-tight seal between the base 5 and the rotor, the outer face of the rim 17 has formed therein a groove 20 for receiving a split steel ring 21. This ring 21 is formed similar to a piston ring, and its terminals can be beveled and arranged in overlapping relation, as suggested in Figure 3 of the drawings.

Normally, the measuring chamber 19 is out of registration with the discharge opening of the base, and hence the lower end of the chamber is sealed by the engagement of its walls with the bottom wall 9. It is desirable to form a part of the bottom wall 9 separable from the main portion thereof, and hence this bottom wall 9 includes a removable sector shaped plate 22, which can have formed thereon the discharge spout 23.

In order to hold the removable plate 22 in frictional floating contact with the lower face of the wall 16 of the rotor, the plate is engaged by a relatively heavy leaf spring 24. The outer end of the leaf spring engages the plate 22, and this end of the leaf spring can be provided with a manipulating knob 25. The inner end of the leaf spring is anchored to a bracket 26, which is rigidly secured to the lower wall 9 of the base by suitable fastening elements, such as screws 27.

At this point it is well to note that I provide a centrally disposed holding rod 28. This rod extends axially through the rotor and the base, and has its lower end provided with a reduced screw-threaded shank 29. The shoulder formed by the reduced shank 29 rests upon the bracket 26, and a nut 30 is threaded on the shank against the lower face of the bracket, which firmly holds the rod in position. The provision of the shank 29 forms an ideal means for anchoring the spring 24 in place. Hence, the inner end of the spring has formed therein an opening to receive the shank, and when the nut 30 is threaded on the shank, the spring is confined between the bracket and the nut.

The cover 11 for the hopper has formed therein an axial opening through which normally extends the upper end of the rod 28, and this end of the rod can be threaded for the reception of an internally threaded knob 31. A gasket 32 is interposed between the knob and the cover to prevent the creeping in of moisture between the knob and the said cover. Obviously, by tightening the knob 31 on the rod 28, the cover will be held in firm contact with the hopper, and the hopper will be held in firm contact with the base.

Surrounding the lower end of the rod 28 above the bracket 26 is a rotatable hollow shaft 33. This shaft extends into the hub 14 of the rotor, and the hub is anchored to the hollow shaft by the use of a suitable key or set screw 34. The shaft extends exteriorly of the base, and has secured thereto an operating crank 35. A portion of the crank can extend into an axial boss 36 formed on the base for sealing contact therewith. The crank 35 extends radially from the hollow shaft, and is provided with a suitable manipulating handle 37. With this arrangement and construction, upon operation of the handle the rotor is caused to move in the base.

As heretofore brought out, one of the salient features of the invention is the provision of novel means for sealing the upper end of the measuring compartment 19 when this compartment is moved into registration with the discharge opening and spout 23. This sealing means comprises a valve-like disc 38, which is adapted to normally overlie the upper end of the measuring chamber in firm contact with the upper face of the rotor. If preferred, the lower face of the disc 38, and the upper face of the rotor, can be machined or otherwise smoothened so that a nice engagement will be had between the valve-like disc 38 and said rotor.

Arranged at one side of the measuring chamber is an operating shaft 39 rotatably carried by the rotor. The upper end of the shaft 39 protrudes above the hopper, and has formed thereon, or secured thereto, an outwardly extending crank arm 40. The outer end of the crank arm 40 has formed thereon a sleeve 41, which slidably receives a slide rod 42.

The lower end of the slide rod is rigidly connected with the valve-like disc 38. An expansion spring 43 is coiled about the slide rod 42, and is confined between the sleeve 41 and the disc 38. Thus the disc is normally urged downwardly into intimate contact with the upper face of the rotor. This arrangement gives the disc a floating movement, and insures the proper seal for the measuring chamber.

Rigidly connected with the lower end of the shaft 39 is a segmental gear 44, which is adapted to mesh at certain times with the teeth 45 formed on the stationary gear 46, which surrounds the hollow shaft 33. This gear 46 is rigidly connected to the boss 36 of the base by fastening elements 47.

From the description so far, it can be seen that the dispensing machine operates in the following manner. Considering that the measuring chamber is loaded with the material, and is out of registration with the discharge spout 23, as shown in dotted lines in Figure 2 of the drawings, then, upon movement of the handle 37 in a clockwise direction, the measuring chamber will be brought into registration with the discharge spout so that the material can be placed into a glass or other receptacle. During rotation of the rotor the teeth of the segmental gear 44 will be in engagement with the teeth 45 of the gear 46. Hence, the shaft 39 will be turned, and the valve-like disc 38 will be moved over the measuring chamber. When the measuring chamber reaches the discharge spout, the teeth of the gear 44 will ride past the teeth 45 of the gear 46, and hence the valve-like disc will be held stationary over the measuring chamber.

Figure 2:
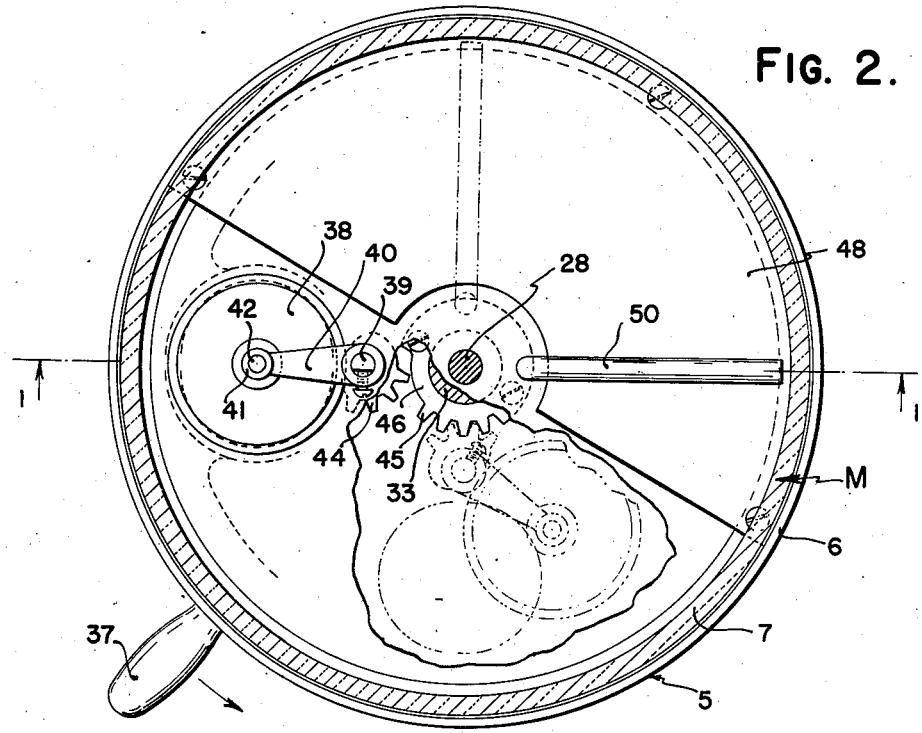
Figure 2 is a horizontal section through the same, taken substantially on the line 2—2 of Figure 1, looking in the direction of the arrows.

If desired, the rotor can be left in this position, and when it is desired to obtain another measured quantity of material, the handle 37 is moved in a counter-clockwise direction (referring to Figure 2). Upon the initial movement of the rotor, no movement will be imparted to the valve disc 38, and the valve disc is held in its closed position until the measuring chamber 19 has ridden past the discharge spout 23. At this time the teeth of the gear 44 will engage the teeth 45 with the gear 46, and hence the valve disc will be moved away from the measuring chamber to permit the free flow of the material therein. The handle 37 can either be returned to its normal position by the operator, or a spring (not shown) can be utilized for this function. By this arrangement and operation of parts, it can be seen that a seal is maintained in the hopper or jar at all times.

It is highly desirable to support a portion of the material in the jar or hopper by some other means than the rotor. I therefore place a semi-circular supporting plate 48 directly above the rotor and secure the same to the upper shoulder formed on the base 5 adjacent to the flange 6. This plate 48 is arranged at one side of the valve disc 38, and does not interfere with the swinging movement of said valve disc. A semi-circular filler ring 49 can be placed on that portion of the shoulder below the hopper, which is not occupied by the semi-circular plate 48. The plate 48 forms what might be called a dead spot in the hopper, and thus during the movement of the rotor the supporting plate tends to hold the material thereon against movement. This is important, in that as the rotor moves in a counter-clockwise direction (see Figure 2), and the valve disc swings to its open position, the material will be urged toward the measuring chamber, and thus the filling of this chamber will be insured.

To prevent the packing of the material on the supporting plate, I provide an agitator arm 50. This arm 50 is anchored to the hub 14 of the rotor 13, and thus the agitator arm moves over the plate upon movement of the rotor. Any desired means can be provided for supporting the hopper and its base, and, as illustrated in Figure 1, I can provide a hollow supporting column 51 having a socket 52 in its upper end. This socket is adapted to detachably receive a shank or boss 53, which can be formed on the bracket 26. If desired, a holding screw 54 can be placed through the column, and threaded into said boss or shank 53.

Figure 5:
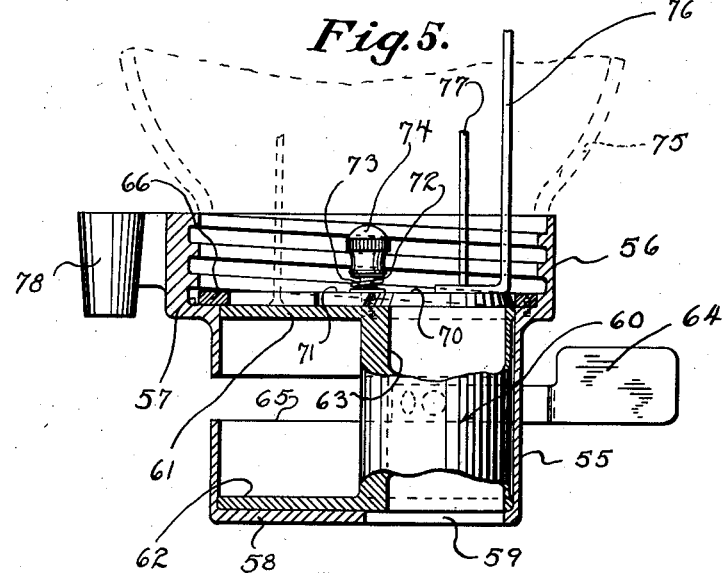
Figure 5 is a vertical sectional view through a modified form of dispenser, the view being taken substantially on the line 5—5 of Figure 6.
Figure 6:
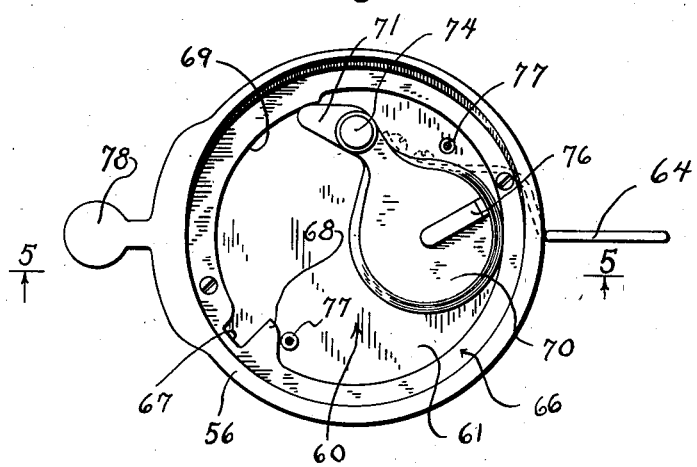
Figure 6 is a top plan view of the base of the dispenser, showing the valve disc in its closed position.
Figure 7:
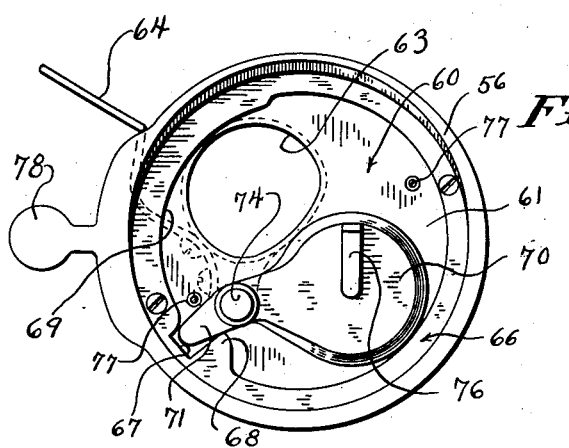
Figure 7 is a view similar to Figure 6, showing the valve disc in its open position to permit the reloading of the measuring chamber.

In Figures 5 to 7 inclusive, I have shown a slightly modified form of my invention, which is particularly adapted for use in households for dispensing measured quantities of ground coffee.

In this form of my invention, I provide a substantially cylindrical base portion 55 having formed on its upper end an enlarged internally threaded neck portion 56. At the juncture of the neck 56 with the cylindrical body 55 an internal annular shoulder 57 is provided, the purpose of which will be set forth later. The lower end of the body 55 is closed by a bottom wall 58, which has formed therein a discharge opening 59.

A rotor 60 is mounted within the body, and the same includes upper and lower spaced discs 61 and 62, which are held in their spaced relation by the measuring chamber 63, which is in the nature of a tube. This measuring chamber opens out through the upper and lower ends of the rotor, and the lower end of the measuring chamber is adapted to be brought into and out of registration with the discharge opening 59 by means of an operating lever 64, which is rigidly secured to the rotor. This operating lever 64 projects through a slot 65 formed in the body 55, as is clearly shown in Figure 5 of the drawings. Obviously, by manipulating the lever 64, the rotor can be turned in the desired direction, so that the measuring chamber can be brought into and out of a discharging position.

If desired, the rotor can be held in the body 55 against accidental displacement by a retaining and sealing ring 66, which is secured on the shoulder 57. This ring has its inner periphery provided at a predetermined point with a notch 67 and a radially extending stop arm 68. A cam face 69 leads from the notch, as can be clearly seen by referring to Figures 6 and 7 of the drawings.

The upper end of the dispensing chamber 63 is adapted to be closed by a valve disc 70, and this disc has formed thereon an outwardly projecting crank-arm or tooth 71. This arm is apertured intermediate its ends for receiving the pivot post 72 anchored to the upper plate 61 of the rotor. A coil spring 73 is placed around the post for normally urging the valve disc into frictional and sealing contact with the upper plate 61. A cap nut 74 is threaded on the post against said spring, and, obviously, this nut can be adjusted for regulating the tension of the spring 73.

In operation of this form of my dispenser, the threaded neck 56 of the base is adapted to be threaded on the mouth of a hopper 75, which can be in the nature of a fruit jar, and considering that the valve disc 70 is in an open position, as shown in Figure 7, the substance in the hopper will gravitate into the measuring chamber 63. When the valve disc is in its open position, the lower end of the measuring chamber is out of registration with the discharge opening 59 of the body, and the crank or lever 71 is positioned in the notch 67.

When it is desired to discharge the contents of the measuring chamber, the lever 64 is turned in a clockwise direction, which will turn the rotor. The arm or crank 71 will be held momentarily against movement by the wall of the notch 67, and as the rotor continues its movement, the valve disc 70 will be swung to a closed position over the upper end of the measuring chamber 63, and upon continued rotation of the rotor, the arm or crank 71 will ride out of the disc and will ride along the cam face 69. The movement of the arm or crank over the cam face 69 insures the positive closing of the valve disc.

When the lever reachs the end of its movement, the chamber 63 will be in direct alinement with the discharge opening, and, thus, the contents of the valve will fall therefrom.

After the contents of the chamber has been discharged, the rotor is returned to its normal position, and when the arm or crank 71 strikes the stop shoulder 78, the arm will be guided into the notch 67, which will hold the arm and swing the valve disc 70 to its open position, so that the measuring chamber can again be charged.

The peripheral edge of the disc is preferably beveled so as to facilitate its travel over the upper surface of the top plate 61, and the disc can carry an agitating arm 76, which is movable with the disc between a pair of upstanding agitating arms 77 carried by the top plate 61 of the rotor. The base 55 can be supported in any preferred manner, and, as illustrated, the neck 56 of the base carries the radially extending tapered tongue 78, which is adapted to be received in a socket of a wall bracket (not shown).

Changes in details may be made without departing from the spirit or the scope of my invention, but what I claim as new is:

1. In a dispensing and measuring machine of the character set forth, a base having a discharge opening, a hopper supported by the base, a rotor movable in the base below the hopper, means for actuating the rotor for disposing the measuring chamber into and out of registration with the discharge opening, said rotor having an anuular groove in its outer face, and a resilient split ring fitted in said groove having frictional bearing contact with the inner face of the base.

2. In a dispensing and measuring machine of the character described, a hollow base, a hopper supported by the base, a rotor movably mounted in said hollow base having a measuring chamber therein opening out through the upper and lower faces thereof, the base having a discharge opening, means for actuating the rotor from the exterior of the base to move the measuring chamber into and out of registration with the discharge opening, a cover for the upper end of the measuring chamber, and means for automatically moving the cover over the measuring chamber in sealing contact with the rotor when the measuring chamber is moved into registration with the discharge opening.

3. In a measuring and dispensing machine, a hollow base having a discharge opening, a hopper carried by the base, a rotor movably mounted in said base having a measuring chamber opening out through the upper and lower faces thereof, means for actuating the rotor from the exterior of the base for moving the measuring chamber into and out of registration with the base, a valve disc for normally covering the upper end of the measuring compartment, means normally maintaining a seal between said valve disc and the rotor, and means automatically operable upon movement of the rotor for moving the valve disc over and away from the discharge chamber according to the direction of rotation of said rotor.

4. In a measuring and dispensing machine of the character described, a hollow base having a discharge opening, a hopper supported by the base, a rotor mounted in said base having a measuring chamber opening out through the upper and lower faces of the rotor, means for operating the rotor exteriorly of the base whereby to move the measuring chamber into and out of registration with the discharge opening, a spring-pressed floating valve disc to normally close the upper end of the measuring chamber, and means automatically moving the disc away from the measuring chamber when the measuring chamber is moved from out of registration with the discharge opening whereby to permit the re-filling of said measuring chamber.

5. In a measuring and dispensing machine of the character described, a hollow base having a discharge opening, a hopper supported by the base, a rotor mounted in said base having a measuring chamber opening out through the upper and lower faces of the rotor, means for operating the rotor exteriorly of the base whereby to move the measuring chamber into and out of registration with the discharge opening, a spring-pressed floating valve disc to normally close the upper end of the measuring chamber, means automatically moving the disc away from the measuring chamber when the measuring chamber is moved from out of registration with the discharge opening whereby to permit the refilling of said measuring chamber, and a seal between the rotor and the base.

6. In a measuring and dispensing machine of the character described, a hollow base having a discharge opening, a hopper supported by the base, a rotor mounted in said base having a measuring chamber opening out through the upper and lower faces thereof, means for actuating the rotor exteriorly of the base for moving the chamber into and out of registration with the discharge opening, an upright shaft rotatably carried by said rotor, a sector pinion on said shaft, a sector gear rigidly carried by the base, a crank arm on said shaft, a spring-pressed floating valve disc carried by the crank arm for engaging the upper surface of the rotor and for closing the upper end of the measuring chamber when said measuring chamber is in registration with the discharge opening, said shaft being rotatable upon movement of the rotor by the intermeshing of the teeth of the segmental gear and pinion, as and for the purpose specified.

7. In a measuring and dispensing machine, a hollow base having a discharge opening, a hopper connected with the base, means for forming a seal between the hopper and the base, a rotor movably mounted in said base having a measuring chamber, means for actuating the rotor from the exterior of the base for moving the measuring chamber into and out of registration with the discharge opening, a sector rod rigidly connected with said base extending through the hopper, a removable cover for the upper end of the base, a gasket interposed between the cover and the hopper, said cover having a central opening for receiving the rod, and a knob threaded on said rod for moving the cover into binding contact with the hopper, and the hopper in binding contact with the base, said cover and knob having a sealing gasket therebetween.

8. In a measuring and dispensing machine of the character described, a hollow base having an axial boss, said base also having a discharge opening, a hopper connected with said base, a rotor mounted in said base having a measuring chamber, means for actuating the rotor for moving the measuring chamber into and out of registration with the discharge opening, an upright shaft rotatably carried by the rotor, a crank arm on the upper end of the shaft, a spring-pressed valve disc slidably supported by the crank arm for sealing contact with the upper face of the rotor, said valve disc being normally disposed over the measuring chamber when the same is in registration with the discharge opening, a sector pinion on said shaft, a hollow shaft extending through the axial boss of the base, means anchoring the hollow shaft to the rotor, an operating crank secured to the hollow shaft, a sector gear rotatably receiving the hollow shaft and anchored to said boss, the teeth on the sector gear being disposed in the path of the teeth on the sector pinion, as and for the purpose specified.

9. In a measuring and dispensing machine of the character described, a hollow base having an axial boss, said base also having a discharge opening, a hopper connected with said base, a rotor mounted in said base having a measuring chamber, means for actuating the rotor for moving the measuring chamber into and out of registration with the discharge opening, an upright shaft rotatably carried by the rotor, a crank arm on the upper end of the shaft, a spring-pressed valve disc slidably supported by the crank arm for sealing contact with the upper face of the rotor, said valve disc being normally disposed over the measuring chamber when the same is in registration with the discharge opening, a sector pinion on said shaft, a hollow shaft extending through the axial boss of the base, means anchoring the hollow shaft to the rotor, an operating crank secured to the hollow shaft, a sector gear rotatably receiving the hollow shaft and anchored to said boss, the teeth on the sector gear being disposed in the path of the teeth on the sector pinion, a bracket secured to the lower surface of the base, an anchor rod secured to the bracket and extending axially through the hollow shaft and rotor and through the hopper, a cover for the hopper, and a knob threaded on the upper end of the rod into engagement with the cover, as and for the purpose specified.

10. In a measuring and dispensing machine of the character set forth, a hollow base including an annular rim and a bottom wall, a hopper carried by the base, a rotor mounted in said base having a measuring compartment, means for actuating the rotor from the exterior of the base, the lower wall of the base having a cut-out portion below the rotor, a sector shaped plate snugly fitted in said cut-out portion having a discharge opening, and spring means normally holding said plate in frictional contact with the lower surface of the rotor.

11. In a dispensing and measuring machine of the character described, a hollow base, a hopper supported by the base, a rotor movably mounted in said base having a measuring chamber therein opening out through the upper and lower faces thereof, the base having a discharge opening, means for actuating the rotor from the exterior of the base to move the measuring chamber into and out of registration with the discharge opening, a cover for the upper end of the measuring chamber, means for automatically moving the cover over the measuring chamber in sealing contact with the rotor when the measuring chamber is moved into registration with the discharge opening, and an agitating arm carried by and movable with said cover.

12. In a dispensing and measuring machine of the character described, a hollow base, a hopper supported by the base, a rotor movably mounted in said base having a measuring chamber therein opening out through the upper and lower faces thereof, the base having a discharge opening, means for actuating the rotor from the exterior of the base to move the measuring chamber into and out of registration with the discharge opening, a cover for the upper end of the measuring chamber, means for automatically moving the cover over the measuring chamber in sealing contact with the rotor when the measuring chamber is moved into registration with the discharge opening, an agitating arm carried by and movable with said cover, and agitating arms disposed on opposite sides of the chamber carried by said rotor.

13. In a dispensing and measuring machine of the character set forth, a base, a hopper supported by the base, a rotor in said hopper having a measuring chamber movable toward and away from a discharging opening in said base, means for turning said rotor, a cover for the upper end of the measuring chamber rockably mounted on the rotor, said base having a notch and a stop shoulder adjacent said notch on its inner face, and an arm formed on the cover movable into said notch during rotation of the rotor to bring about the swinging of the cover toward and away from the measuring chamber.

14. In a dispensing and measuring machine of the character described, a hollow base having a discharge opening in its lower end, and a threaded neck at its upper end, there being a shoulder at the juncture of the body and neck, a rotor mounted in said base including upper and lower spaced plates, a measuring tube connecting said plates and opening out through the upper and lower ends of the rotor, a retaining ring secured to the shoulder and partially overhanging the rotor, manual means for actuating the rotor to move the measuring tube into and out of registration with the discharge opening, said ring having a notch and a stop shoulder on its inner surface, a valve disc for said measuring chamber, an outwardly extending arm on said disc, a pivot post extending through the arm and into the rotor, spring means on the post normally holding the valve disc into frictional contact with the rotor, the arm being movable into and out of the notch for swinging said disc during movement of the rotor, and a cam face on the inner surface of the ring leading from said notch and disposed in the path of said arm, as and for the purpose specified.

15. In a dispensing and measuring chamber, a base having a discharge opening, a hopper supported by the base, a rotor in said base having a measuring compartment, means for moving the measuring compartment into and out of registration with the discharge opening, means for maintaining a seal between the rotor and the base, and a movable cover for the measuring chamber, said cover being movable over the measuring chamber when the measuring chamber is in registration with the discharge opening to prevent the entrance of air and moisture into the hopper through said measuring chamber.

JOHN W. BELL.